Patented July 30, 1935

2,009,977

UNITED STATES PATENT OFFICE 2,009,977

WELDING ROD

Richard A. Wilkins, Rome, N. Y., assignor to Revere Copper and Brass Incorporated, Rome, N. Y., a corporation of Maryland No Drawing. Application February 28, 1935, Serial No. 8,783

10 Claims. (Cl. 219—8)

My invention relates to welding rods, and has among its objects the provision of an easily fabricated rod, which when in use minimizes fuming and permits the weld to be formed rapidly, while securing such desirable properties of the weld as extreme ductility, penetration, and freedom from cracks.

The invention will be best understood from the following description, while its scope will be more particularly pointed out in the appended claims.

Welding rods suitable for welding copper, phosphor-bronzes, silicon-bronzes, tin-bronzes, and steel, which will secure a corrosion resistant weld of ductility and tensile strength commensurate with the ductility and tensile strength of these materials, have long been desired. Welding rods heretofore suggested, although meeting these requirements to a degree, have been defective in numerous particulars, especially in respect to causing excessive fuming, excessive strains in the weld tending to form detrimental cracks, and extreme slowness in forming the weld.

Applicant has found that the above mentioned difficulties can be overcome by using a high copper content silicon-bronze, say one having at least 92 to 93% copper, into which are incorporated suitable proportions of tin and phosphorus.

By suitably proportioning these metals it has been found that the rods may be readily fabricated by hot rolling and drawing so as to permit them to be more economically produced than by casting or cold rolling or drawing processes. At the same time is produced a weld metal which practically eliminates fuming, and especially in the troublesome "arc welding" process causes the metal to flow freely and more easily, thus resulting in a sounder and stronger weld and increasing the welding speeds. Further, it has been found that by use of such a welding rod the formation of excessive strains in the weld, which in turn tend to form detrimental hair-line cracks, is avoided, while the weld produced possesses great ductility, high tensile strength, and excellent resistance to corrosion.

Welding rods according to the invention contain the copper, silicon, tin and phosphorus preferably in the form of an alloy.

In this alloy silicon in amounts up to 4.7% may be employed, but it should not exceed this value lest it render the alloy brittle. The silicon acts to increase the tensile strength of the weld, and appreciable results ordinarily will be obtained with amounts of silicon in excess of 0.1%. Extremely satisfactory results ordinarily will be obtained with 0.25 to 4% silicon, although if a rather high tensile strength is desired commensurate with the tensile strength of many silicon-bronzes the amount of silicon should not be less than 2%.

For all values of silicon above mentioned at least 0.1% tin should be present to secure satisfactory corrosion resistance, and ductility, which latter the silicon tends to decrease. For all values of silicon up to 3% the tin should not exceed 2%, lest the alloy be rendered "hot short". With values of silicon above 3% the tin should not exceed a value which decreases linearly from 2 to 0.9% with the increase in the amount of silicon up to 4.7%, lest the alloy be rendered "hot short". In other words, the maximum amount of tin should not exceed 2% when 3% silicon is present, and should not exceed 0.9% when 4.7% silicon is present, and as the silicon is gradually increased from 3 to 4.7% the permissible maximum amount of tin should uniformly or linearly decrease from 2 to 0.9%. Excellent results will be secured with up to 1.5% tin if the silicon does not exceed 3.8% or is not less than 0.25%, and excellent results will also be secured with up to 1.4% tin if the silicon does not exceed 4% or is not less than 0.25%. For best all around results the amount of tin may be 0.25 to 1% and, for all values of tin within this range, the silicon 2 to 4%.

The phosphorus acts as a deoxidizer, and seems also to lower the melting point of the rod, making the metal flow more easily at the welding temperature, particularly in "arc welding", thus increasing the speed at which the weld may be formed and securing a sounder and stronger weld. It also has been found to reduce the fuming, and when proper amounts are employed tends to prevent the formation of excessive strains in the weld when it cools, and thus prevents the formation of fine cracks which usually are detrimental in respect to the strength of the weld.

Appreciable results will be secured with as low as 0.005% phosphorus. Ordinarily the amount of phosphorus should not exceed 0.1%, as an amount in excess of this, particularly when the amounts of silicon and tin are high, tends to render the alloy somewhat "hot short". However, when the amounts of silicon and tin are low as much as 0.25% phosphorus may be employed.

In respect to the silicon, tin and phosphorus the balance of the alloy may be substantially all copper. For all around purposes excellent results will be secured with approximately 96% copper, 3.5% silicon, 0.05% phosphorus, and 0.5% tin.

In the manufacture of copper alloys it is, for economic reasons, difficult to prevent the presence of small amounts of zinc, which latter in a welding rod tends to cause fuming. Best results will be secured in this respect with the above described welding rods if the amount of zinc present does not exceed 0.25%. This amount of zinc is not objectionable, as in the presence of phosphorus it does not cause material fuming, and tends to secure homogeneity in the alloy and slightly improve its workability in fabricating the rod.

It will be understood that the values and proportions specified are approximate, not absolute, and that within the scope of the invention small amounts of metals other than those specified may be entered into the alloy for imparting special characteristics when the presence of these metals does not materially destroy other desirable characteristics of the welding rod.

I claim:—

1. Welding rods containing copper, silicon, tin and phosphorus in approximately the following ranges and proportions: 0.1 to 4.7% silicon; at least 0.1% tin for all values of silicon, but not exceeding 2% for all values of silicon up to 3%, and, for values of silicon above 3%, not exceeding a value which decreases linearly from 2 to 0.9% with the increase in the amount of silicon from 3 to 4.7%; at least 0.005% but not more than 0.25% phosphorus; the balance being substantially all copper.

2. Welding rods according to claim 1 in which the range of phosphorus is approximately 0.005 to 0.1%.

3. Welding rods according to claim 1 containing appreciable amounts up to approximately 0.25% zinc.

4. Welding rods according to claim 1 in which the range of phosphorus is approximately 0.005 to 0.1% containing appreciable amounts up to approximately 0.25% zinc.

5. Welding rods containing copper, silicon, tin and phosphorus in approximately the following ranges and proportions: 0.25 to 3.8% silicon, at least 0.25% but not more than 1.5% tin for all values of silicon, 0.005 to 0.25% phosphorus, balance substantially all copper.

6. Welding rods containing copper, silicon, tin and phosphorus in approximately the following ranges and proportions: 0.25 to 4% silicon, at least 0.25% but not more than 1.4% tin for all values of silicon, 0.005 to 0.1% phosphorus, balance substantially all copper.

7. Welding rods according to claim 5 containing appreciable amounts up to approximately 0.25% zinc.

8. Welding rods according to claim 6 containing appreciable amounts up to approximately 0.25% zinc.

9. A welding rod containing approximately 3.5% silicon, 0.5% tin, 0.05% phosphorus, balance substantially all copper.

10. A welding rod according to claim 9 containing an appreciable amount up to 0.25% zinc.

RICHARD A. WILKINS.